United States Patent Office 3,641,060
Patented Feb. 8, 1972

3,641,060
CARBAMATE INSECTICIDE
Michio Nakanishi, Nakatsu-shi, Obita, Ryosuke Kobayashi and Kozo Abe, Fukuoka, and Toshihiko Mukai, Nakatsu-shi, Obita, Japan, assignors to Yoshitomi Pharmaceutical Industries, Ltd., Osaka, Japan
No Drawing. Filed Sept. 25, 1969, Ser. No. 861,146
Claims priority, application Japan, Sept. 28, 1968, 43/70,678
Int. Cl. C07d 13/04
U.S. Cl. 260—340.7      6 Claims

ABSTRACT OF THE DISCLOSURE

Carbamates of the formula

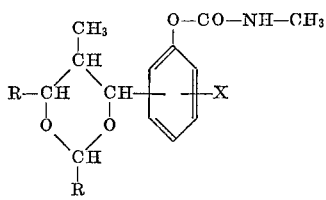

wherein R is H or methyl and X is H, Cl, methyl or methoxy and insecticidal compositions containing same.

---

This invention relates to novel carbamates and insecticidal compositions containing the same.

The carbamates of this invention are represented by the formula

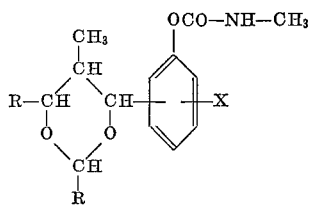
(I)

wherein R is H or methyl and X is H, Cl, methyl or methoxy.

The carbamates (I) can be prepared by the reaction of dioxanylphenol of the formula

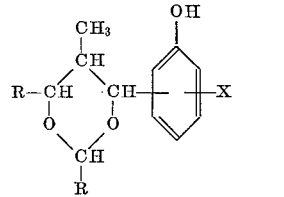
(II)

wherein R and X are as set forth above, with methyl isocyanate (Method A). The reaction is advantageously carried out in a closed reaction vessel in the presence of a solvent (e.g., benzene, toluene, ether, dioxane, dichloroethane) and a catalytic amount of triethylamine or pyridine or the like at a temperature between room temperature (20° C. to 30° C.) and 150° C.

The carbamates (I) can also be prepared by the reaction of the phenol (II) with phosgene to form a chloroformate of the formula

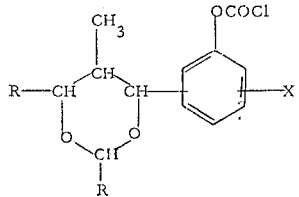
(III)

wherein R and X are as set forth above followed by amination of the chloroformate with methylamine (Method B).

The chloroformate (III) can be prepared by adding a solution of phosgene in benzene or toluene to an aqueous solution containing the phenol (II) and a base such as sodium hydroxide at —20° to 30° C. Alternatively, an organic base, such as pyridine or triethylamine, may be used as the base, but the reaction is then preferably carried out in anhydrous benzene, toluene or dioxane.

The amination is preferably carried out by bringing a solution of chloroformate (III) in a solvent such as benzene, toluene or dioxane, into contact with a solution of methylamine in a solvent such as water, benzene, toluene, ether or dioxane at 0° to about 20° C. It is preferable to use 2 to 2.5 mols of methylamine per mol of the chloroformate. Further, instead of one mol of methylamine, one mol of a strong alkali such as a caustic alkali may be used.

The starting compounds of Formula II can be prepared by the reaction of a propenylphenol of the formula

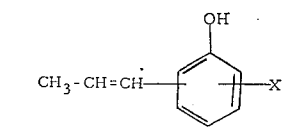

(IV)

wherein X is as set forth above, with an aldehyde of the formula

R—CHO      (V)

wherein R is as set forth above, or a substance which can yield the aldehyde (V) under the reaction conditions, such as paraformaldehyde or trioxane. The reaction is carried out in a solvent, preferably a polar solvent, such as dioxane, dimethylformamide, dimethyl sulfoxide or pyridine, in the presence of an acid which can promote the reaction, such as hydrochloric, sulfuric, phosphoric, boric, formic or acetic acid, at a temperature between 0° C. and 100° C., preferably from 0° C. to room temperature.

EXAMPLE 1

Preparation of Compounds of Formula II

A mixture of 110 grams of o-(1-propenyl) phenol, 65 grams of paraformaldehyde, 330 milliliters of dioxane and 50 milliliters of 10% hydrochloric acid was stirred at room temperature for 24 hours. To the resulting transparent reaction mixture was added 500 milliliters of water, and the whole mixture was extracted with toluene. The toluene layer was washed with water, dried over anhydrous sodium sulfate and then concentrated. Distillation of the residue under reduced pressure gave 4-(o-hydroxyphenyl)-5-methyl-1,3-dioxane distilling off at 114–117° C./1. mm. Hg in 60.5% yield (96.5 grams). $n_D^{25}=1.5378$.

By following the above procedure, but substituting equivalent amounts of the appropriately substituted propenyl phenol and aldehyde starting materials in the reaction mixture, the following compounds have likewise been prepared:

4-(4-hydroxy-3-methoxyphenyl)-5-methyl-1,3-dioxane,
  B.P. 158–162° C./1. mm. Hg
4-(2-hydroxy-5-methylphenyl)-5-methyl-1,3-dioxane,
  B.P.130–145° C./5 mm. Hg, M.P. 67–68° C.
4-(5-chloro-2-hydroxyphenyl)-5-methyl-1,3-dioxane,
  M.P. 68–73° C.
4-(4-hydroxy-3-methoxyphenyl)-2,5,6-trimethyl-1,3-dioxane (paraaldehyde being used in place of paraformaldehyde), B.P. 144–149° C./0.4 mm. Hg, M.P. 180–184° C.

Typical but non-limitative examples of the preparation of the carbamates of this invention are as follows:

EXAMPLE 2
Method A 2 grams of 4-(2-hydroxyphenyl)-5-methyl-1,3-dioxane are dissolved in 20 milliliters of benzene. Methyl isocyanate (0.8 gram) and a few drops of triethylamine are added. The resulting mixture is stirred at room temperature for 4 hours. Thereafter, the benzene is distilled off. Crystallization of the remaining oil (2.5 grams, $n_D^{26}=1.5228$) from a benzene-hexane mixture gives 2 grams of crystalline 4-(2-methylcarbamoyloxyphenyl)-5-methyl-1,3-dioxane, which melts at 110° to 111° C.

EXAMPLE 3
Method B 10 milliliters of a toluene solution containing 2 grams of phosgene is added to 20 milliliters of an aqueous solution containing 4 grams of 4-(2-hydroxyphenyl)-5-methyl-1,2-dioxane and 0.8 gram of sodium hydroxide and the resulting mixture cooled to 10° C. Thereafter the mixture is stirred at room temperature for 2 hours. The toluene layer, which contains 4-(2-chloroformyloxyphenyl)-5-methyl-1,3-dioxane, is then separated. To the toluene layer is added, with stirring and at a temperature below 20° C., 3 milliliters of a 30% aqueous methylamine solution. Then 50 milliliters of toluene are added, the whole mixture is well stirred and the toluene layer is separated and dried over sodium sulfate. The toluene is distilled off, and the crystalline residue (M.P. 60° C. to 68° C.) is recrystallized from a benzene-hexane mixture to give 3.7 grams of crystalline 4-(2-methylcarbamoyloxyphenyl)-5-methyl-1,3-dioxane, which melts at 110° to 111° C.

The following carbamates (I) have also been prepared by following the procedures of Methods A and B, substituting equivalent amounts of appropriately substituted starting materials therein:

4-(3-methoxy-4-methylcarbamoyloxyphenyl)-5-methyl-1,3-dioxane, melting at 106° to 108° C.;
4-(3-methyl-2-methylcarbamoyloxyphenyl)-5-methyl-1,3-dioxane, melting at 125° to 127° C.;
4-(3-chloro-6-methylcarbamoyloxyphenyl)-5-methyl-1,3-dioxane, melting at 173° to 176° C.;
4-(3-methoxy-4-methylcarbamoyloxyphenyl)-2,5,6-trimethyl-1,3-dioxane, viscous oil, $n_D^{26.5}=1.5158$ The carbamates of this invention effectively kill various agricultural and household pests such as flies (e.g., housefly), mosquitoes (e.g., Culex species), weevils (e.g., Adzuki bean weevil), cockroaches (e.g. German cockroach), green rice leafhoppers, mites and aphids. They possess strong systemic and residual insecticidal activity.

EXAMPLE 4

The compound of the invention (one part) was mixed thoroughly with powdered milk (99 parts) in a mortar, and a portion of the mixture was put in a small petri dish (3 cm. in diameter). The dish and a water supply bottle (a 20 cc. Erlenmeyer flask filled with tap water and stopped up with absorbent cotton) were placed in a glass pot (18 cm. in diameter, 15 cm. high). Ten individuals of the adult housefly Musca domestica vicina Takatsuki strain (male and female) anesthetized with carbon dioxide were put into the pot, and the pot was covered with wire gauze. After 24 hours feeding at room temperature, the mortality percentage was calculated. Four pots were used for each test compound. The results were as follows:

| Test compound: | Mortality after 24 hrs. (percent) |
|---|---|
| 4-(2-methylcarbamoyloxyphenyl)-5-methyl-1,3-dioxane | 92.5 |
| 4-(3-methoxy-4-methylcarbamoyloxyphenyl)-5-methyl-1,3-dioxane | 95 |

EXAMPLE 5

The same procedure as in Test 1 was repeated, but using 10 individuals of the German cockroach Blattella germanica Linne (male) per pot. The result was as follows:

| Test compound: | Mortality after 24 hrs. (percent) |
|---|---|
| 4-(2-methylcarbamoyloxyphenyl)-5-methyl-1,3-dioxane | 100 |

Insecticidal compositions are prepared by mixing at least one of the carbamates of this invention with a suitable carrier therefor in the conventional known manner. The carrier may be, for example, a liquid such as benzene, toluene, xylene, acetone, methyl isobutyl ketone, dimethylformamide, solvent naphtha, methylnaphthalene, kerosene: a solid such as talc, clay, bentonite kaolin, diatomaceous earth, fish meal, dried milk, starch, yeast, or a mixture thereof. The compositions may contain a surface active agent such as polyoxyethylene alkyl (or alkylphenyl) ether or polyoxyethylenesorbitan fatty acid ester, or other adjuvants. Thus, the compositions may take the form of emulsions or emulsifiable concentrates, wettable powders, dusts, solutions, or baits. The compositions may also contain other insecticides, as well as miticides, fungicides, herbicides, fertilizers and the like.

Examples of formulations are as follows (parts being by weight):

EXAMPLE 6
Dust

| | Parts |
|---|---|
| Compound of Formula I (e.g. 4-(2-methylcarbamoyloxyphenyl)-5-methyl-1,3-dioxane) | 2 |
| Clay or talc | 98 |

EXAMPLE 7
Oil base

| | Parts |
|---|---|
| Compound of Formula I (e. g. 4-(2-methylcarbamoyloxyphenyl)-5-methyl-1,3-dioxane) | 0.3 |
| Dieldrin | 2 |
| Kerosene | 97.7 |

EXAMPLE 8
Wettable powder

| | Parts |
|---|---|
| Compound of Formula I (e.g. 4-(2-methylcarbamoyloxyphenyl)-5-methyl-1,3-dioxane) | 30 |
| Sodium lignin-sulfonate | 5 |
| Polyoxyethylene nonylphenyl ether | 5 |
| Clay | 60 |

One part of the composition is diluted with 500 to 1,000 parts of water before use.

EXAMPLE 9
Emulsifiable concentrate

| | Parts |
|---|---|
| Compound of Formula I (e.g. 4-(3-methoxy-4-methylcarbamoyloxyphenyl)-5-methyl-1,3-dioxane) | 25 |
| Polyoxyethylene nonylphenyl ether | 15 |
| Toluene | 60 |

One part of the composition is diluted with 500 to 1,000 parts of water before use.

EXAMPLE 10
Bait

| | Parts |
|---|---|
| Compound of Formula I (e.g. 4-(3-chloro-6-methylcarbamoyloxyphenyl)-5-methyl-1,3-dioxane) | 1 |
| Fish meal | 10 |
| Bran | 34 |
| Starch | 50 |
| Yeast | 5 |

What is claimed is:

1. A compound of the formula

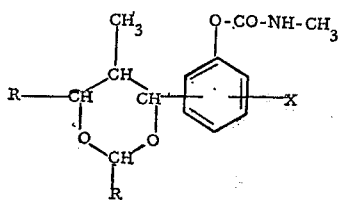

wherein R is H or methyl and X is H, Cl, methyl or methoxy.

2. A compound according to claim 1 having the name 4-(2-methylcarbamoyloxyphenyl)-5-methyl-1,3-dioxane.

3. A compound according to claim 1 having the name 4-(3-methoxy-4-methylcarbamoyloxyphenyl)-5-methyl-1,3-dioxane.

4. A compound according to claim 1 having the name 4-(3-methyl-2-methylcarbamoyloxyphenyl)-5-methyl-1,3-dioxane.

5. A compound according to claim 1 having the name 4-(3-chloro-6-methylcarbamoyloxyphenyl)-5-methyl-1,3-dioxane.

6. A compound according to claim 1 having the name 4-(3-methoxy-4-methylcarbamoyloxyphenyl)-2,5,6-trimethyl-1,3-dioxane.

References Cited

UNITED STATES PATENTS 3,275,657   9/1966   Winter et al. _____ 260—340.7

ALEX MAZEL, Primary Examiner

J. H. TURNIPSEED, Assistant Examiner

U.S. Cl. X.R.

424—278